Dec. 15, 1942.   H. W. JEFFERS, SR   2,305,259
DAIRY APPARATUS
Filed July 5, 1940   12 Sheets-Sheet 1
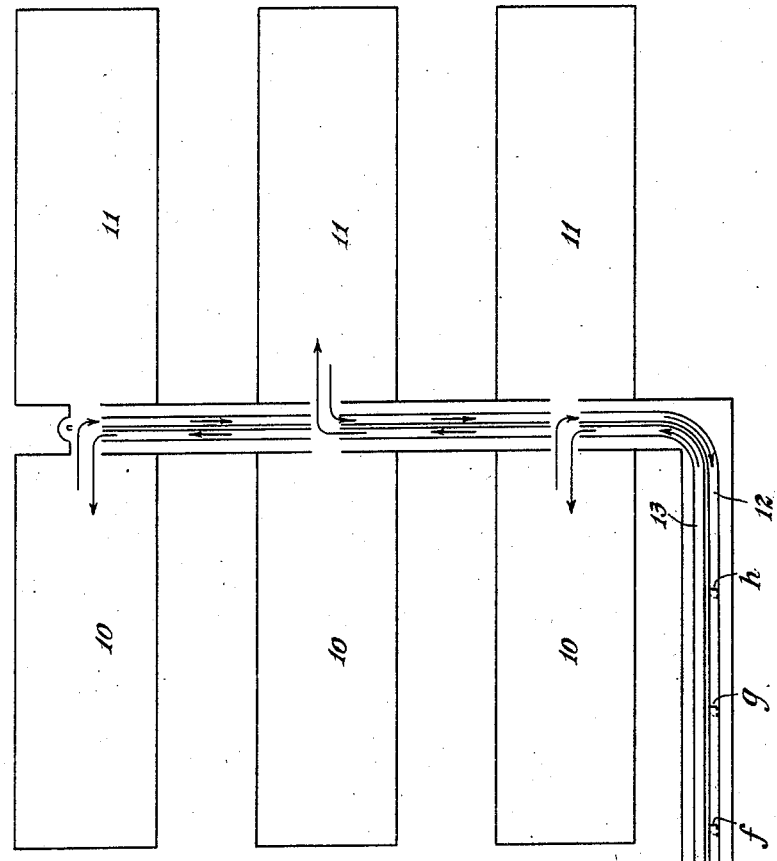
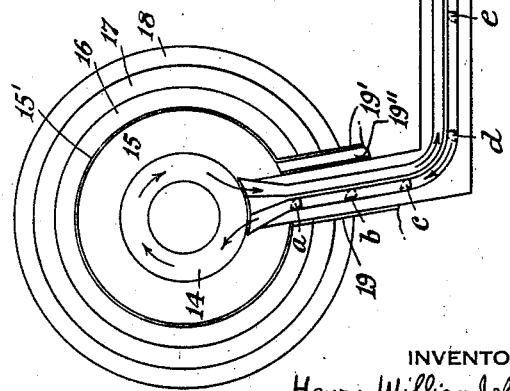
Fig.1.
INVENTOR
Henry William Jeffers, Sr.
BY
E. C. Sanborn
ATTORNEY Dec. 15, 1942. H. W. JEFFERS, SR 2,305,259
DAIRY APPARATUS
Filed July 5, 1940 12 Sheets-Sheet 5

INVENTOR
Henry William Jeffers, Sr.
BY
E. C. Sanborn
ATTORNEY

Dec. 15, 1942.  H. W. JEFFERS, SR  2,305,259
DAIRY APPARATUS
Filed July 5, 1940  12 Sheets-Sheet 6

INVENTOR
Henry William Jeffers, Sr.
BY
E. C. Sanborn
ATTORNEY

Dec. 15, 1942.  H. W. JEFFERS, SR  2,305,259
DAIRY APPARATUS
Filed July 5, 1940  12 Sheets-Sheet 7

INVENTOR
Henry William Jeffers, Sr.
BY
E. C. Sanborn
ATTORNEY

Dec. 15, 1942.  H. W. JEFFERS, SR  2,305,259
DAIRY APPARATUS
Filed July 5, 1940   12 Sheets-Sheet 9

INVENTOR
Henry William Jeffers, Sr.
BY
E.C. Sanborn
ATTORNEY

Dec. 15, 1942. H. W. JEFFERS, SR 2,305,259
DAIRY APPARATUS
Filed July 5, 1940 12 Sheets-Sheet 11

INVENTOR
Henry William Jeffers, Sr.
BY
E. C. Sanborn
ATTORNEY

Dec. 15, 1942.  H. W. JEFFERS, SR  2,305,259
DAIRY APPARATUS
Filed July 5, 1940  12 Sheets-Sheet 12

INVENTOR
Henry William Jeffers, Sr,
BY
E. C. Sanborn
ATTORNEY

Patented Dec. 15, 1942

2,305,259

UNITED STATES PATENT OFFICE 2,305,259

DAIRY APPARATUS

Henry William Jeffers, Sr., Plainsboro, N. J., assignor to The Borden Company, New York, N. Y., a corporation of New Jersey Application July 5, 1940, Serial No. 344,087

37 Claims. (Cl. 31—58)

This invention relates to a dairy system and has for an object the provision of novel and efficient means which enables cows to pass successively on to a moving platform and to be subjected to the operations incident to hygienic milking while traveling with said platform.

A feature of the invention comprises a rotary platform or turntable having provisions for receiving the cows in tandem relation, and for enabling them to be milked and subjected to other operations while in that relation on said platform.

The invention further provides a new and advantageous arrangement of stalls, including gates and stanchions and means for automatically controlling the operation thereof at appropriate times during the movement of the platform.

In addition, the invention provides for controlling the passage of the cows from their barns to the platform in timed relation to the travel of the latter.

Still another feature of the invention comprises novel and effective means for supplying vacuum and power to the moving platform.

The invention further provides a rotary milking platform which is not only highly efficient and presents the advantages above indicated, but is also considerably cheaper to construct than the rotary milking tables heretofore employed and which furthermore enables the milking and other operations to be displayed to the public in a particularly distinctive and appealing manner.

Other features and advantages of the invention will be hereinafter described and claimed.

In the accompanying drawings, which illustrate a practical embodiment of the invention:

Fig. 1 is a diagrammatic view illustrating a milking system provided by my invention, including barns, walk-ways, and moving platform.

Figure 2:
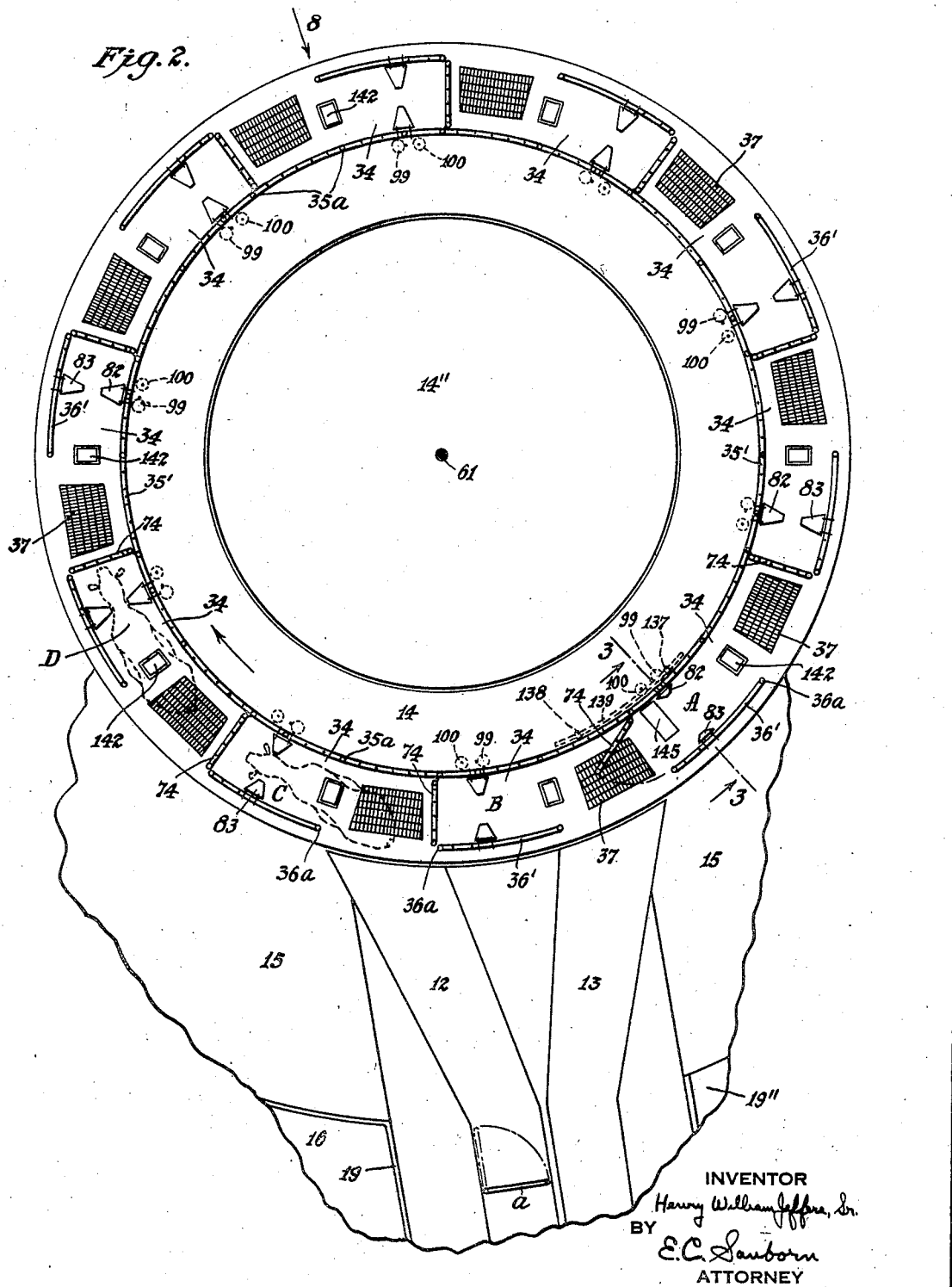
Fig. 2 is a diagrammatic view of the moving platform and certain associated parts embodying features of the invention.

Referring to the drawings, a system which may be utilized in the practice of my invention is illustrated diagrammatically in Figure 1, where two series of barns are designated as 10, 11, and are connected by walk-ways 12 and 13 with a moving platform 14. The latter, as shown, may be of annular form and may be surrounded by an area 15 for workmen and attendants. Where the milking of the cows is to be exhibited to the public, an amphitheater comprising a plurality of zones for visitors may be provided, as indicated at 16, 17, and 18, said visitors' zones surrounding the workmen's area 15 and being positioned at progressively increasing heights. A glass partition 15' may separate the visitors' zones from the workmen's space 15.

The walkway 12 through which the cows pass from the barns to the platform or table 14 may be provided with a series of gates designated *a—h*, respectively, which are operated in timed relation to the movement of the table 14 as hereinafter more specifically described. The walk-way 13 provides for the return of the cows from the table 14 to the barns.

The zones 15, 16, 17, and 18, may, as shown, be of substantially annular form, each of said zones terminating adjacent a region bounded by suitable walls 19, 19', through which region pass the aforementioned walkways 12 and 13, as well as a passage 19'' to the workmen's space 15.

Figure 6:
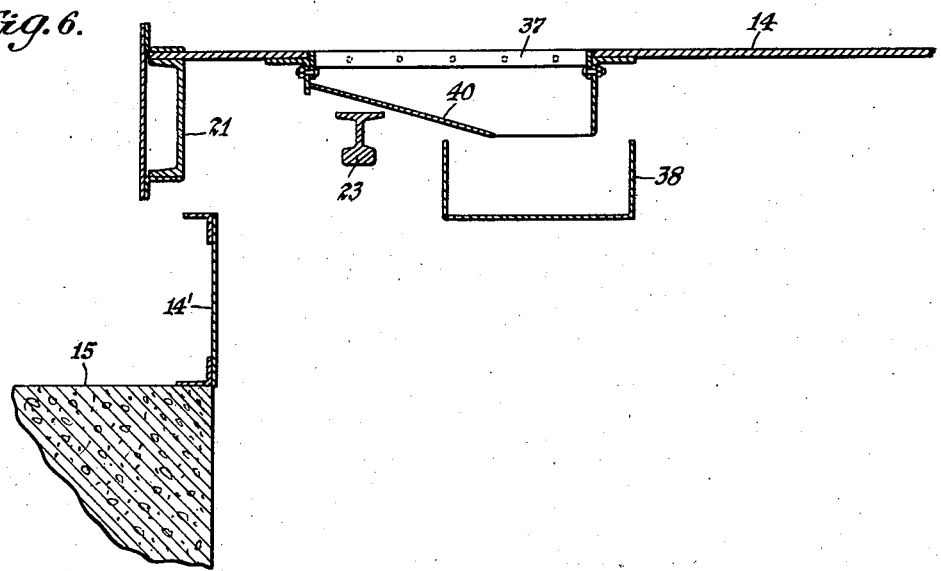
Fig. 6 is a detail view in vertical section, on line 6—6 of Fig. 5.
Figure 12:
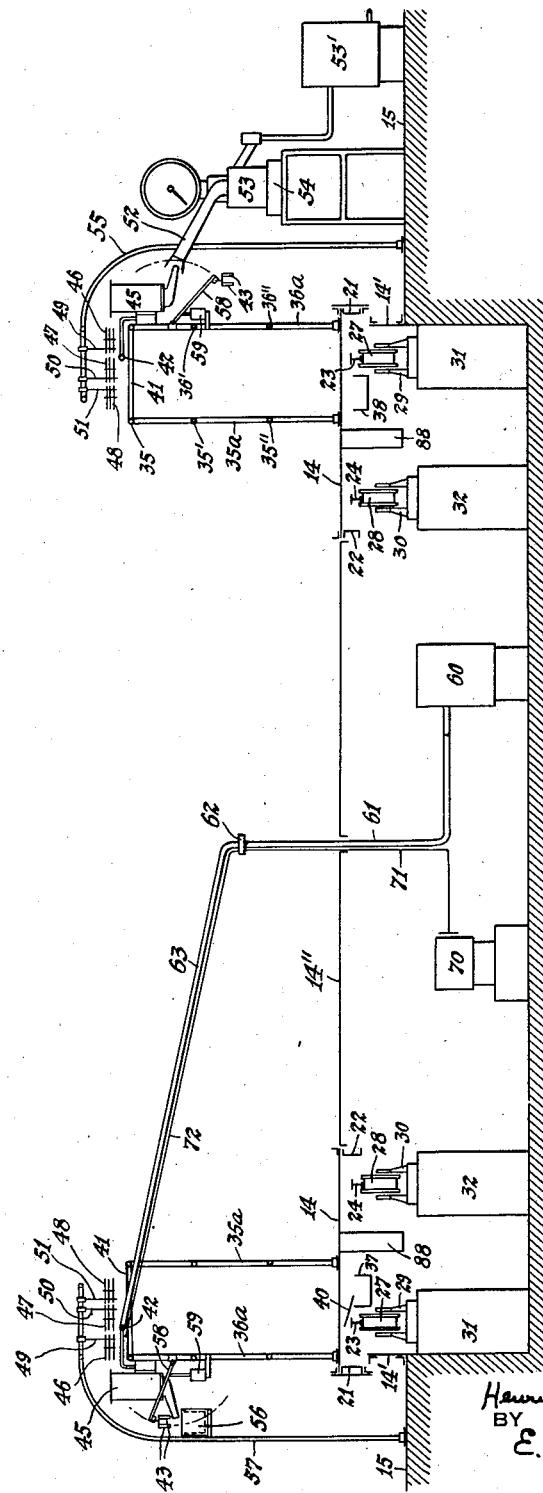
Fig. 12 is a diagrammatic view, the left hand portion of which is taken along the left hand section line designated 12 in Figure 11, and the right hand portion of which is taken along the right hand section line 12 of said Fig. 11.

The moving annular platform or table 14 may extend over an excavation, as shown in Figure 12, and may comprise flooring mounted on beams 20 (Fig. 3) disposed radially around said platform and secured at their inner and outer ends to channel girders 21, 22 (Figures 3 and 12) which are suitably curved to conform to the shape of the platform. A pair of concentric rails or tracks 23, 24 are secured to the under sides of the beams 20 by suitable clamping devices 25, 26, and said rails are designed to rest upon two concentric series of wheels 27, 28 (Figs. 3 and 12) which are properly mounted in order to constitute means for supporting the table 14 for rotary travel. Said rails may be ordinary railroad rails and the wheels similar to railroad car wheels. Preferably, the table is elevated some distance (about two feet, for example) above the workmen's area 15, as shown in Figures 6 and 12; the space between said area and said table being surrounded by a suitable wall such as indicated at 14'.

The walkways 12 and 13 may be on the ground level and the platform 14 may also be positioned on said ground level; the workmen's area 15 being below said platform as previously stated, but above the bottom of the excavation beneath said platform.

Figure 13:
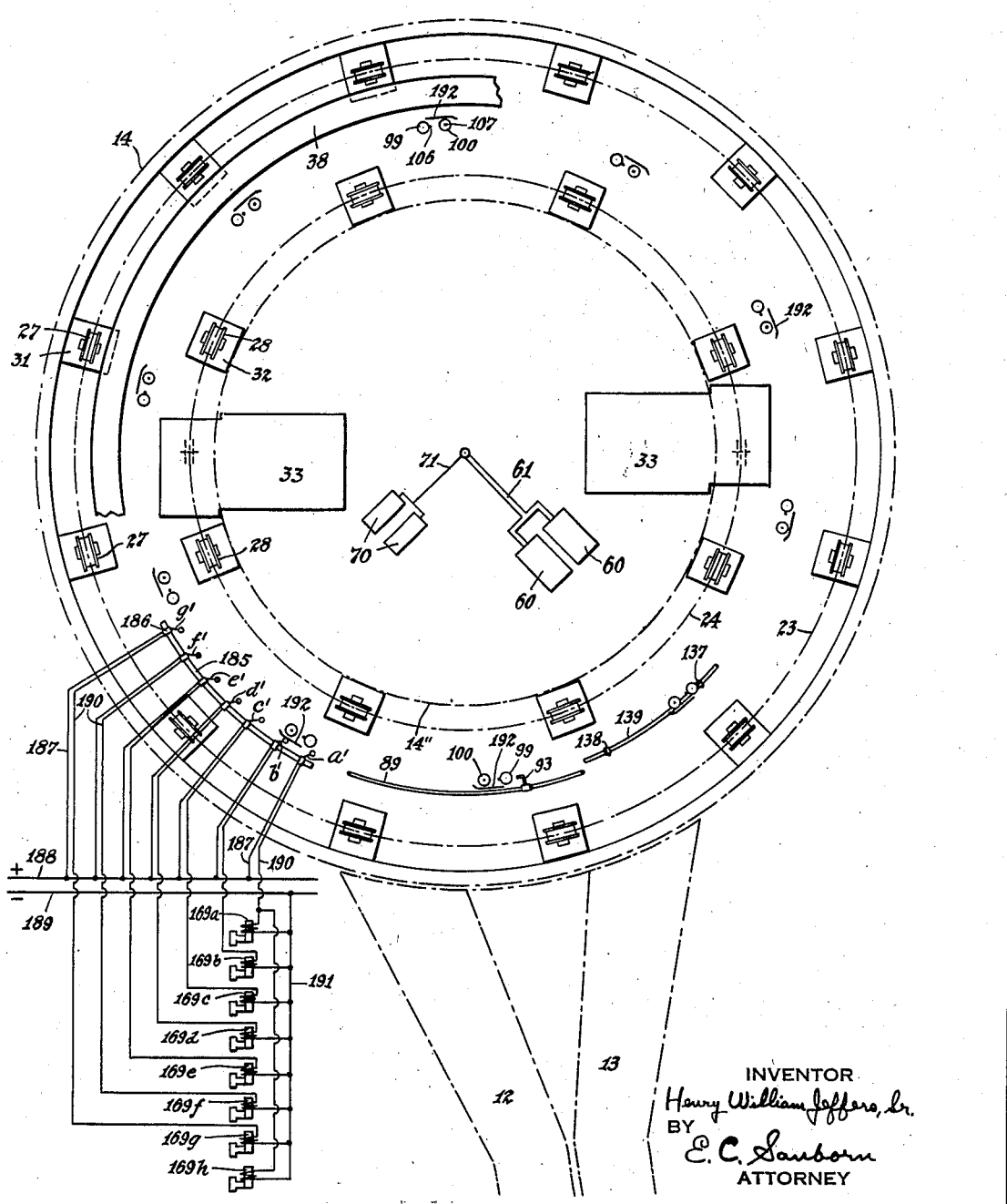
Fig. 13 is a diagrammatic view showing various features associated with the platform, including electrical connections for controlling gates in the walk-way from the barns to the platform.

The wheels aforesaid may be journaled in series of pedestals 29, 30 mounted on supports 31, 32, which may be of reinforced concrete, in the aforementioned excavation. Two of said wheels 28, preferably diametrically opposite, are positively driven by motors, through any suitable connections of conventional form, in casings 33, 33 (Fig. 13). To prevent slippage between the wheels and rail in the drive, the pedestals or bearings 30 may be yieldingly mounted in any well known or approved form. Such mounting may also be provided for the bearings or pedestals that carry the wheels 27, if desired.

The upper surface of the platform 14 has a circumferential series of stalls, designated 34, disposed successively or in tandem relation to each other, as shown in Figure 2. These stalls may, as shown in Figures 2–5, be formed by inner and outer circumferential frames; the inner frame comprising vertical pipes 35a suitably fixed to the table 14 and carrying three circumferential series of horizontal pipes designated 35, 35', and 35''. The outer frame similarly comprises vertical pipes 36a fixed to said table and carrying a circumferential series of upper pipes 36. Sets of pipes 36' and 36'' are also positioned between and carried by certain of said vertical pipes 36a below the pipe 36; it being noted, however, that pipes 36' and 36'' are omitted from the space between a pair of the vertical pipes 36a in each stall, thus permitting a cow to enter the stall readily from the walkway 12, as indicated in Figure 2.

Figure 3:
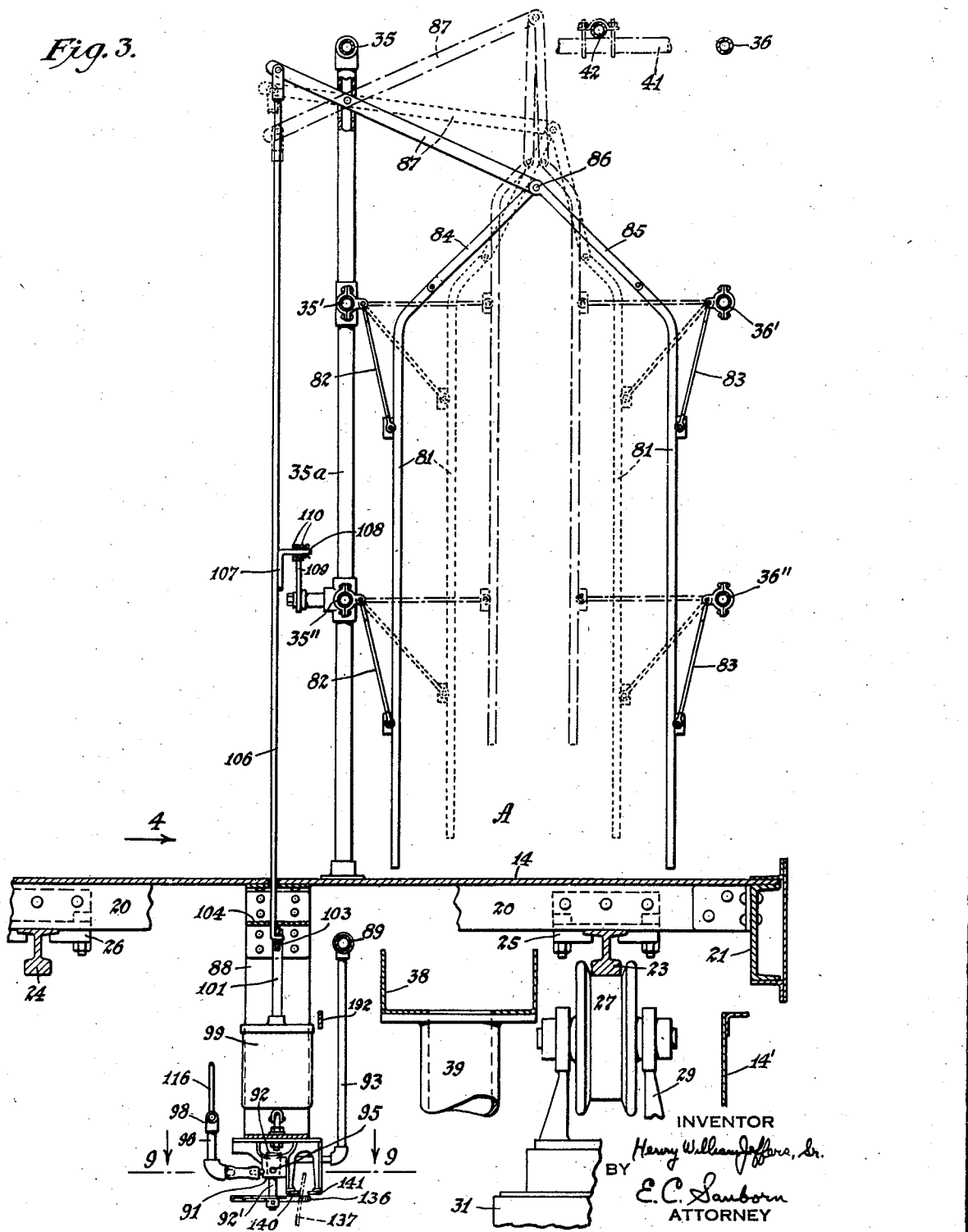
Fig. 3 is an enlarged vertical sectional view taken on line 3—3 of Figure 2.

Each stall also includes a grating 37 in the floor of the rotary platform for enabling manure to pass therethrough into a stationary gutter 38. The latter comprises an annular channel suitably mounted beneath said platform and communicating with a sewer through suitable pipes such as shown at 39 (Fig. 3). Inclined blades 40 (Figure 6) attached to the under side of platform 14 adjacent the respective gratings 37, guide and deflect the manure into the gutter 38.

The inner and outer circumferential pipes 35, 36 of the stall frames are connected by a series of transverse pipes 41 which impart rigidity to said frames and which may also support a vacuum pipe line 42.

The cows may be milked in their respective stalls in any desired manner. For example, the milking may be controlled automatically by means such as disclosed in the Hapgood Patent No. 1,787,152, dated December 30, 1930, or in any other well-known way.

Figure 8:
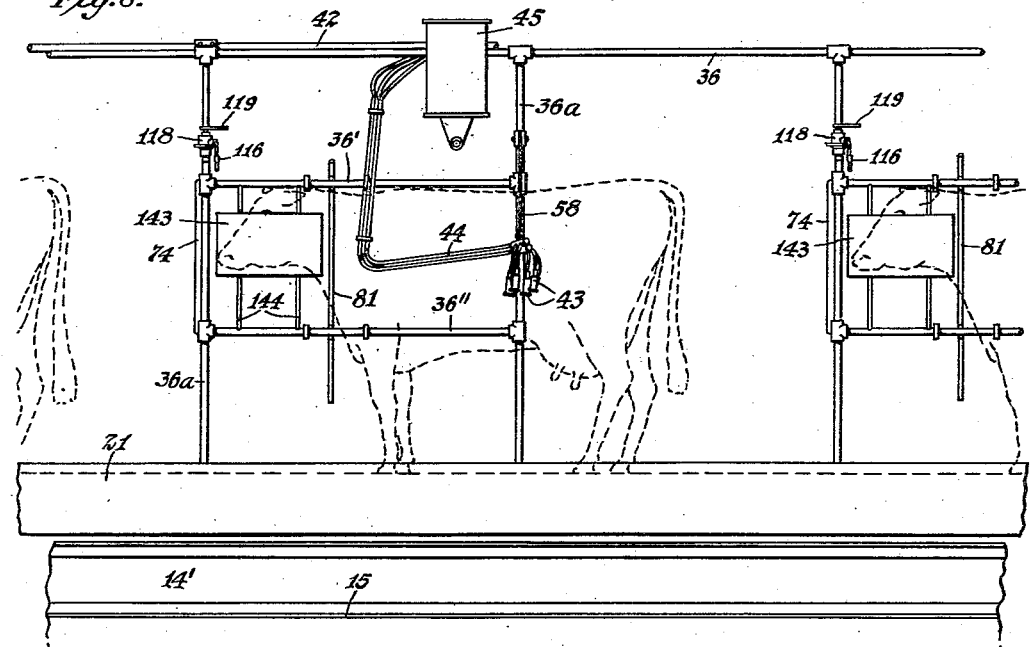
Fig. 8 is an enlarged fragmentary side-elevational view, looking in the direction of the arrow 8 in Fig. 2.

Each of the stalls may be provided for this purpose with a milking machine of well known construction (Figure 8) comprising teat cups 43 and tubes 44, one of which tubes is connected to a milk receiving jar 45 and the other two of which are connected to vacuum and pulsation means as will be readily understood. Since means is well-known (as in said Hapgood patent) for controlling said apparatus to milk the cow during a portion of the rotation of the platform and to cause said milk to be delivered to said jar, said means need not be here described in detail. Likewise, means such as shown in said patent may be provided for controlling, during the travel of the platform, the discharge of the milk from the successive jars as they pass a given point, and for cleaning the teat cups, milk jar and connected milk tube of each milking unit by drawing water therethrough upon passing another station.

Figure 11:
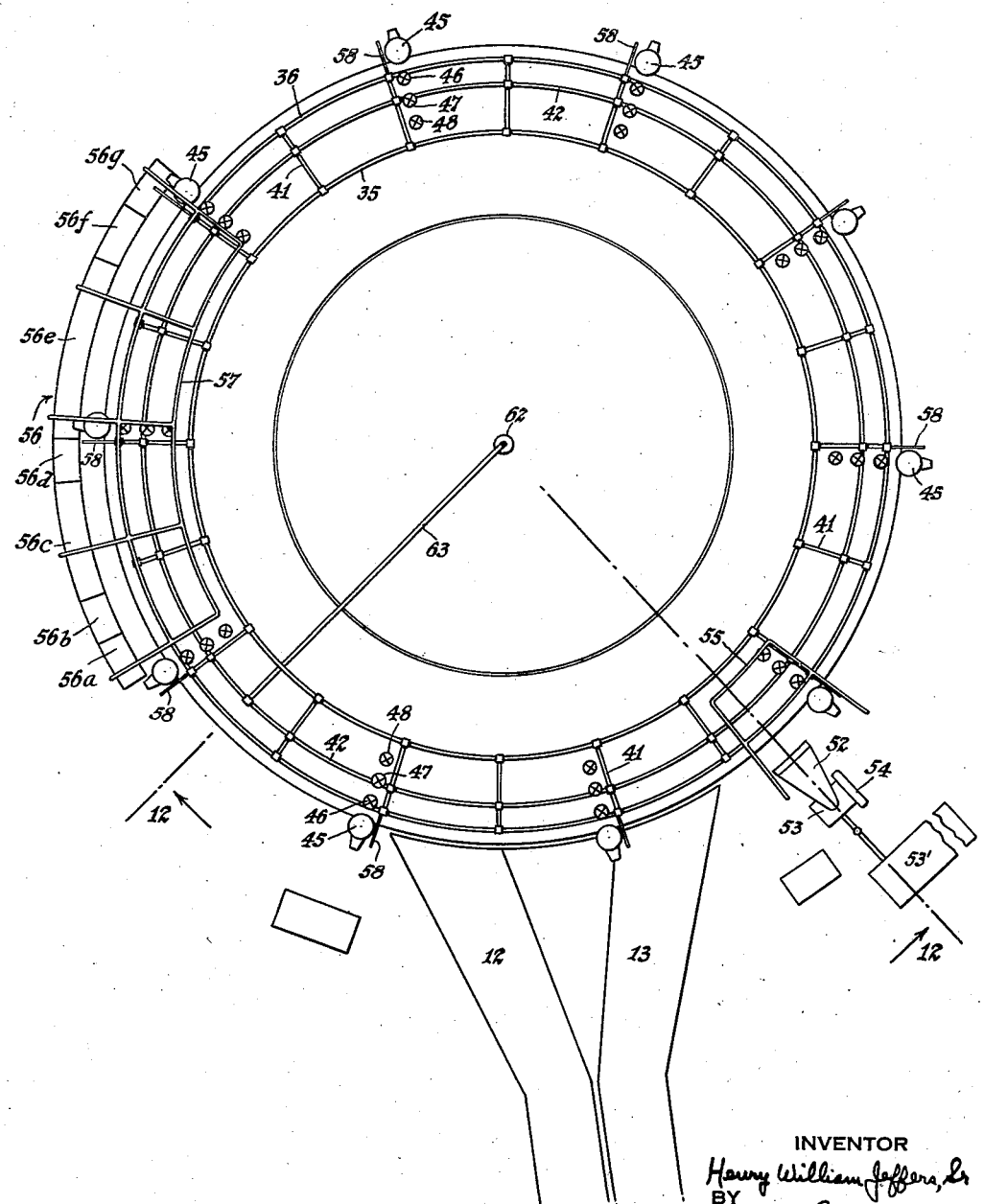
Fig. 11 is a diagrammatic view illustrating the platform in conjunction with certain trip devices and other parts embodying features of the invention.

Since means for controlling the above-mentioned operations during rotation of the platform or table 14 are known in the art, said means need not be specifically described herein. It may be noted, however, that each stall is shown provided with a set of valves, such as indicated at 46, 47, and 48 (Figures 11 and 12) which are operated during the travel of the platform by suitable stationary trip devices, such as 49, 50, and 51 for accomplishing the functions above indicated at the proper times.

Upon arrival opposite a trough 52 of tank 53 (Fig. 12), one of said valves is operated to cut off vacuum from the associated jar 45 and to connect said jar with the atmosphere, as a result of which the milk in said jar is discharged into said tank 53. The latter is mounted on a scale 54. The valve-operating trips adjacent said tank troughs 52 are carried by a stationary frame 55. From the scale-tank 53 the milk may be passed into a storage tank 53'.

A series of water tanks 56 (Figures 11 and 12) is provided along a portion of the rotating table 14, said tanks being suitably supported on stationary framing 57. The latter also carries trip devices, as shown, for actuating the valves 46, 47, and 48 of the respective sets during the rotation of the table.

The teat cups 43 in each stall are carried, when not in use, by an arm 58 pivoted at one end to one of the vertical frame pipes 36a. Each of said arms, instead of being actuated directly by a trip as in said Hapgood patent, may, as shown, be connected to a rod of a piston (not shown) in a cylinder 59, which cylinder may be connected alternately to vacuum and to the atmosphere by operation of one of the associated valves 46, 47, 48. The trips carried by the frame 57 are so arranged that as each milking apparatus passes thereunder, the arms 58 carrying the teat cups of said apparatus is raised from the lower position shown in the right hand portion of Figure 12, into the upper position shown in the left hand portion of said figure. Thereby the respective teat cup carrying arms are raised to clear the water tanks 56. However, as soon as each arm is carried over the first tank 56a of said series of tanks 56, trip devices carried by the frame 57, adjacent said first tank, act upon the associated series of valves to lower said arm 58 into the water in said tank, and to connect the teat cups, milk jar 45 and connected milk tube to vacuum so that water is drawn through said teat cups and milk tube and into said jar. After sufficient cold water in the tank 56a has been drawn into said jar, said trip means operates to cut off the vacuum connection to the jar 45 as a result of which the water is dumped therefrom into the compartment 56b, and at about the same time the arm 58 is raised into its upper position. As rotation of the table 14 continues, the same series of operations is repeated for flushing out the milking unit with cold water from tank 56c and dumping it into compartment 56d; after which said operations are further repeated to flush out said unit with hot water in tank 56e and dump it into compartment 56f. When the arm 58 is adjacent compartment 56g said arm is lowered to permit dripping of water from the flushed-out teat cups and associated parts.

Shortly after each cow enters its stall it may be washed by suitable sprays, as in said Hapgood patent (and also as shown in the Luks Patent No. 1,968,564 dated July 31, 1934); and at a subsequent portion of the travel of said platform, as, for example, during passage of the cow a short distance beyond the compartment 56g, the cow may be dried by hot air, as in said Hapgood and Luks patents, and also massaged if desired. Then the operator may apply the teat cups of the milking apparatus to the cow; after which the proper valves are operated, either manually or automatically by trip devices, to cause operation of the milking unit and drawing of the milk from the cow to the jar 45. After completion of the milking, the teat cups are detached from the cow, hung on the arm 58, and, upon the arrival of the jar 45 opposite the trough 52, the milk is discharged into said trough as noted above.

Mounted in the aforementioned excavation below the rotating table 14 is a pair of vacuum or exhaust pumps 60 (Figures 12 and 13) connected to a pipe 61 which projects upwardly through an opening in the center of the stationary flooring 14" within the inner circumference of said table. Said pipe 61 at its upper end is connected through a swivel joint 62 with a pipe 63 which extends from said joint into communication with the previously mentioned vacuum pipe 42. The swivel joint aforesaid, which may be of any suitable construction, permits the radially extending pipe 63 to rotate with the table 14 and pipe 42, while the pipe 61 remains stationary.

Also positioned in said excavation is a pair of pulsators 70. At this point it may be noted that the milking machines may be employed in a pneumatic pulsating system such as shown in the Forsyth Patent No. 1,257,688, dated February 26, 1918, or in a pneumatic electric pulsating system, as disclosed in the Daysh and Hapgood Patent No. 1,405,104, dated January 31, 1922, or any other suitable system. For purposes of illustration, the pulsators 70 are shown as of the type employed in a pneumatic electric system; said pulsators being of standard and well-known construction for supplying rapid and intermittent electric current impulses to a pulsator line or cable 71. In the construction shown, said line or cable 71 is stationary and extends through the central opening in floor 14" along the pipe 61 by which said wire may be suitably supported. A line or cable 72 supplies current to standard electro-magnetic pulsator control means in the stalls on said table and is carried by the pipe 63; said line or cable also extending into the swivel joint 62.

Figure 19:
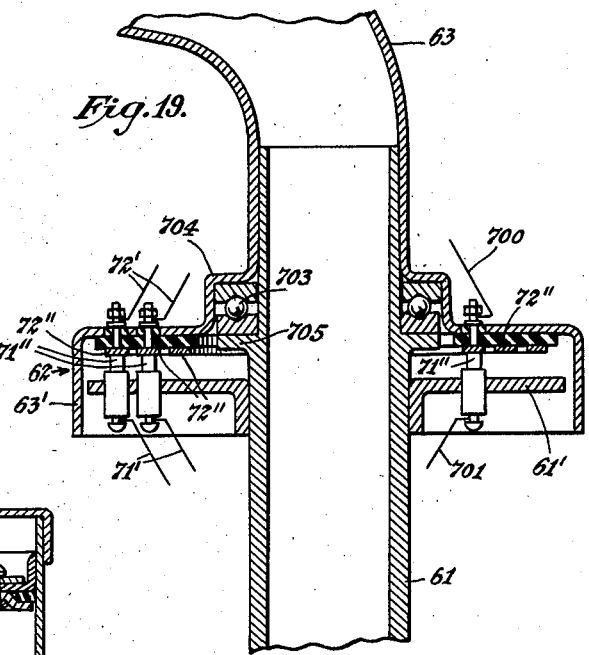
Fig. 19 is an enlarged vertical sectional detail view of a swivel joint for the vacuum and pulsator lines.

Said swivel joint may take any convenient form, such as illustrated in Fig. 19, wherein a plurality of concentric conducting rings 72" are carried by and suitably insulated from a housing extension 63' of the rotating pipe 63. The stationary pipe 61 has fixed thereto a disk 61' which carries a plurality of brushes 71" suitably insulated from said disk and engaging the respective rings 72". In the construction illustrated, the two pulsators 70 supply current impulses to a pair of wires 71' in the cable 71, and said impulses are transmitted through the corresponding pair of brushes 71" and rings 72" to a pair of the wires 72', which are in the cable 72. While only one pulsator 70 and one wire 71' could be provided in associated with one wire 72' for supplying impulses to the pulsating mechanisms of the various milking units, it is found convenient to employ a pair of pulsators and associated wires, one for parts of the milking units and the other for the remainder. Hence, I have shown two pulsators 70, two wires 71', and two wires 72'. Although the return portion of the impulse circuit may be by ground, I have shown a return wire 700 which extends from the pulsator mechanisms of the milking units and is connected to the innermost one of the rings 72", which ring in turn is engaged by the corresponding one of the brushes 71", to which is connected return wire 701 leading to the pulsators 70. The wire 700 may be included in the cable 72, while wire 701 may be included in cable 71.

It will be noted that the swivel joint, as illustrated, may include a bearing 703 between a shoulder 704 of housing 63' and a flange 705 on the stationary pipe 61, whereby the rotating pipe 63, housing 63' and rings 72" are rotatably supported on said stationary pipe 61. The upper portion of pipe 61 may extend into pipe 63 above said bearing as shown, with a snug fit, and suitable lubricant may be employed between said extension and said pipe 63.

If desired, the pulsating mechanism of each milking unit may comprise an electro-magnetic valve such as shown in said Daysh and Hapgood patent, No. 1,405,104, to which electric impulses are sent over one of the wires 72', said valve being connected to the vacuum line 42 and also to one of the pipes 44 of said milking unit, so that pulsations are supplied to the teat cups in a convenient and well-known manner.

Inasmuch as the milking, cleaning, and other operations above referred to may be accomplished in any desired or well-known manner, further explanation thereof is unnecessary for the purposes of the present invention Each of the stalls 34 is provided with a gate 74, suitably hinged on one of the vertical frame standards 35a. Also, each stall is provided with a pair of stanchions 81, 81, for confining the cow in the desired position in the stall.

Each of the stanchions 81, 81 in a stall is pivotally connected to and supported by an adjacent frame element. As shown in Figure 3, one of said stanchions is pivotally connected to a pair of link members 82, 82, which in turn are pivotally mounted on the horizontal frame pipes 35', 35''. The other of said stanchions is pivotally connected to similar link members 83, 83, pivoted on the horizontal frame pipes 36', 36'' of the stall. At their tops, said stanchions are pivoted to links 84, 85, which in turn are pivotally connected at their upper ends by a rod 86, which rod is carried by a lever 87, pivotally mounted on a vertical pipe 35a of the stall framework.

Secured to the bottom of the table 14 are a series of frames 88, each below a corresponding one of the stalls 34. Also suitably suspended from the bottom of said table 14 is a vacuum pipe 89, connected by a pipe 90 (Fig. 4) with the upper vacuum pipe 42.

Figure 9:
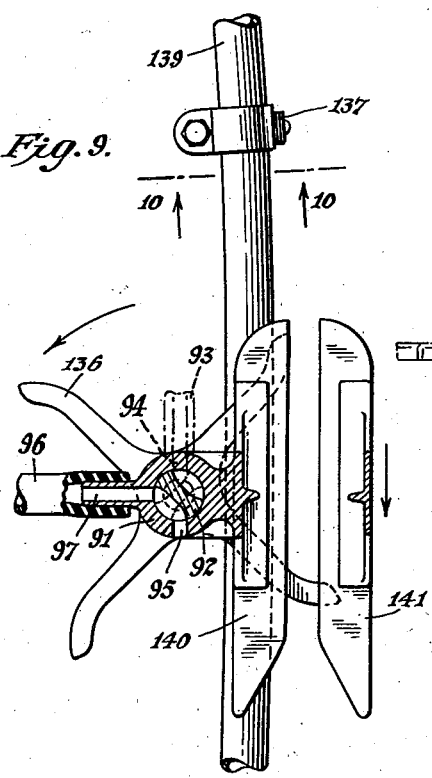
Fig. 9 is an enlarged detail view partly in plan and partly in horizontal section, taken on line 9—9 of Fig. 3.

Each of the frames 88 has suitably fastened thereto and depending therefrom a valve casing 91 containing a rotatable valve 92 (Fig. 9). Piping 93 connected to the vacuum pipe 89 communicates through port 94 with the interior of said casing 91. Another port 95 in said casing is open to atmosphere. Piping 96 communicates with a port 97 in said casing and is connected to a T-shaped fitting 98 (Figures 3 and 4).

Each frame 88 has pivotally mounted on the bottom thereof a cylinder 99 containing a piston 99' (Fig. 17) which is urged into its upper position by a spring 99'', and also a cylinder 100 containing a similar piston and spring. At their upper ends said piston chambers are open to the atmosphere as indicated at 99''' in Fig. 17. The rods 101, 102 of said pistons are pivotally connected to opposite ends, of a lever 103. The latter, as shown, has a curved end 103' adapted to bear against the lower side of a plate 104 as a fulcrum during the movements of said lever to and from the dotted line position in Figure 4. A link 106 is connected at one end to an intermediate portion of said lever 103 and at its opposite end to the previously mentioned stanchion-actuating lever 87.

Connected to the piston rod 102 is a link 107 which is also connected at 108 to a toggle comprising a pair of links 109, 110. The toggle link 109 is pivotally mounted on one of the vertical pipes 35a, while link 110 is pivotally connected at one end to said link 109 and at its other end, through the swivel joint 111, to an extension of an arm 112 which is pivotally supported on another of said pipes 35a. A pin 113, depending from the gate 74, engages a slot in an end of said arm 112.

Figure 4:
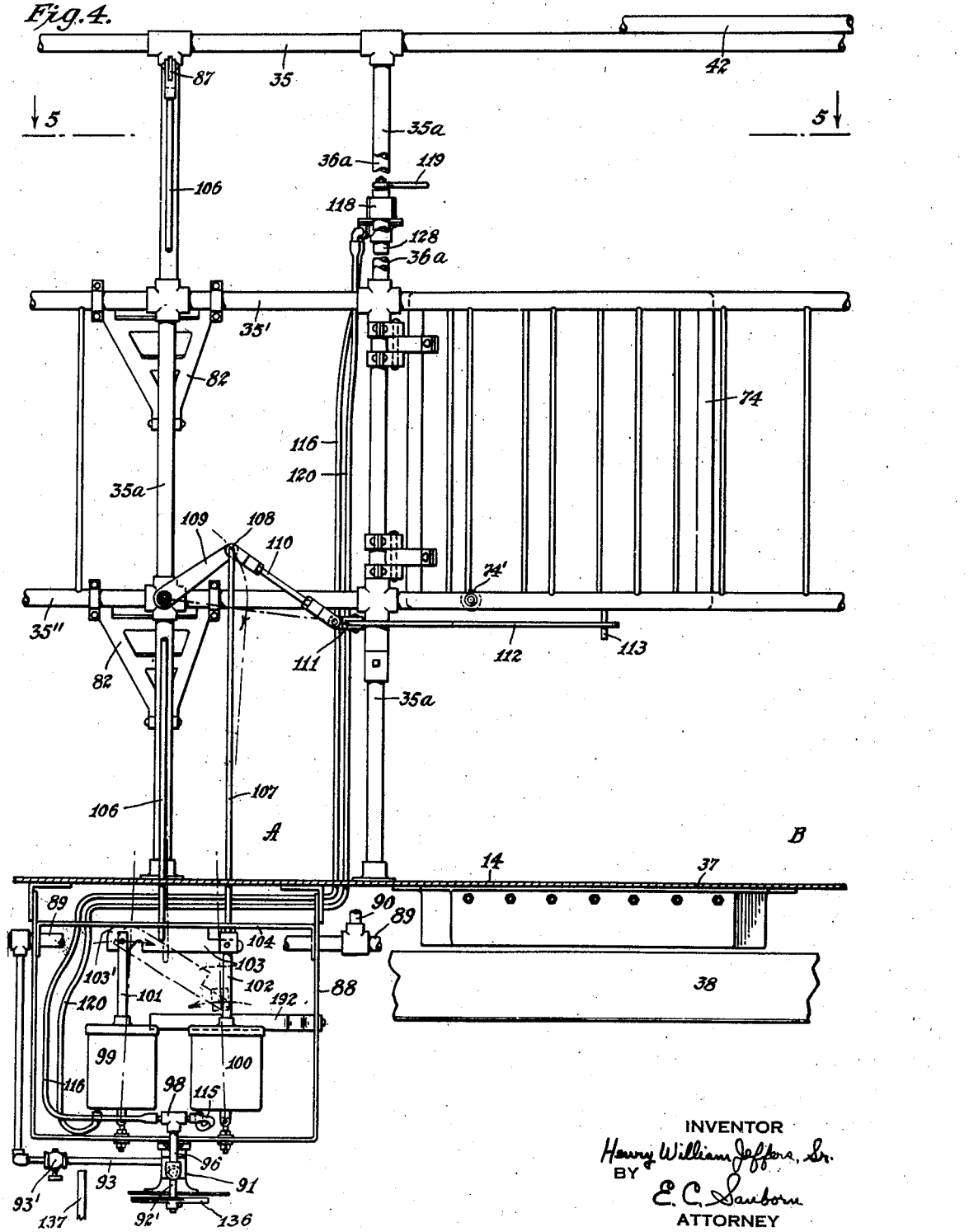
Fig. 4 is a view in side elevation, with the platform in vertical section, looking in the direction of the arrows 4 in Figures 3 and 5.
Figure 5:
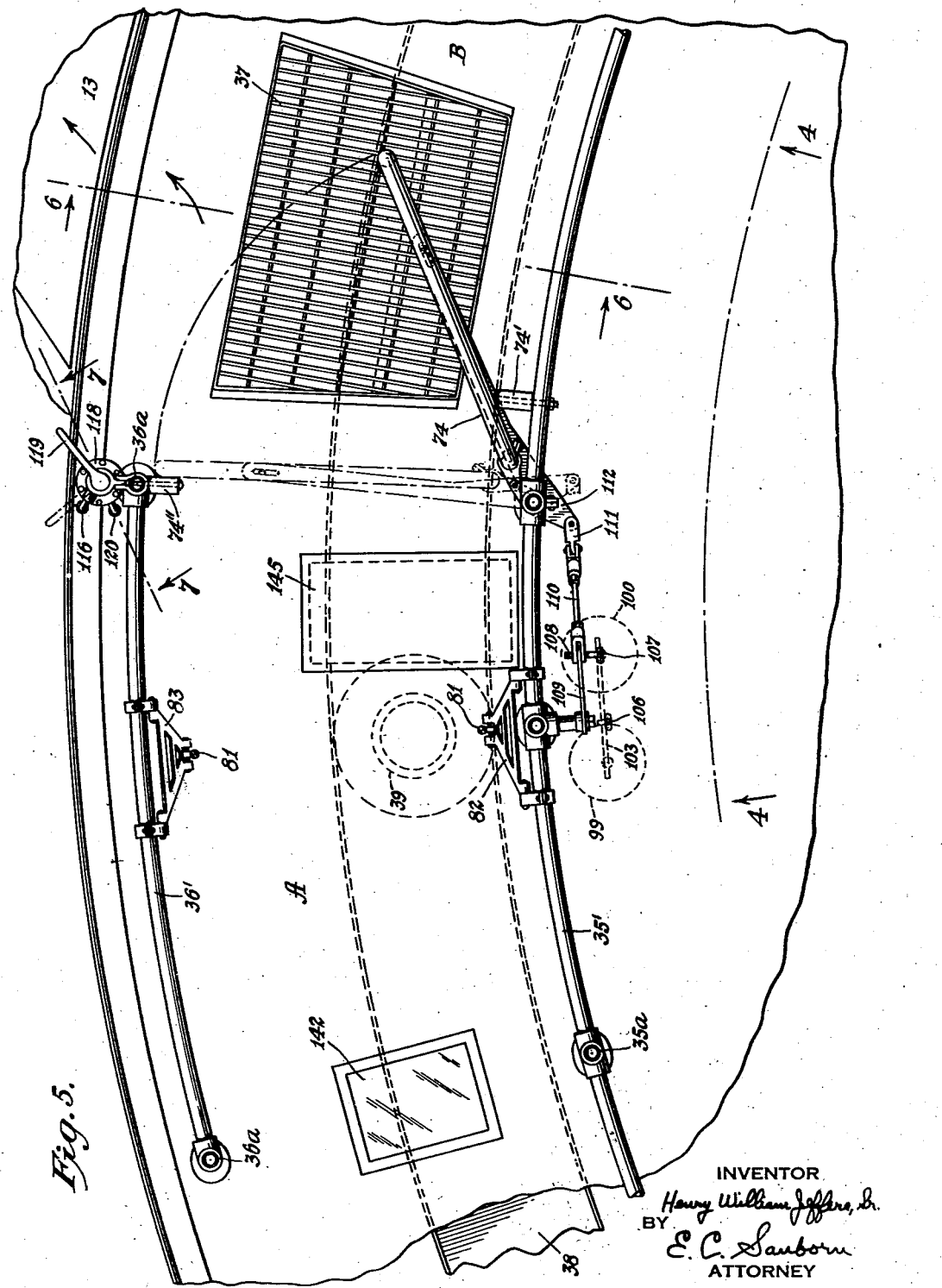
Fig. 5 is a plan view of a portion of the moving platform and certain associated parts, taken on line 5—5 of Fig. 4.

In Figures 4 and 5, the gate 74 is open, so that the cow in the stall (to the left of said gate in Fig. 5, corresponding to the stall at the right of said gate in Figure 2) is free to leave the stall and to enter the exit walkway 13. When said gate is open, the piston rod 102 and link 107 are raised and the toggle links 109, 110 are in the elevated position shown in Figures 4 and 5. If, however, the piston in the cylinder 100 is moved downwardly, it will be apparent that the toggle 109—110 will be straightened and the gate 74 thereby closed.

Through the aforementioned lever 103 and link 106, the lever 87 (Fig. 3) is actuated to operate the stanchions 81. In the position shown in Figures 3 and 4 the piston rods 101 and 102, lever 103, and link 106 are in their uppermost positions, the right hand end of lever 87 is lowered, and the stanchions are in open position. If said lever 103 be now moved into the dotted line position in Fig. 4, lever 87 is brought into the intermediate position indicated by dotted lines in Figure 3, and the stanchions are shifted toward each other into the "set" position, in which they are shown in dotted lines. Subsequent downward movement of piston rod 101 from its Fig. 4 position rocks the associated end of lever 103 downwardly, draws link 106 into its lowermost position, and shifts the lever 87 and stanchions into the dot-dash lines in Fig. 3, in which the stanchions are in their closed position.

It has previously been noted that the pipe 96 which communicates with port 97 in the valve casing 91 is connected to a T-shaped pipe coupling 98. One end of the horizontal portion of said coupling communicates through flexible tube 115 with the interior of the piston chamber 100 through the bottom of said chamber. The other end of said horizontal portion of coupling 98 communicates through a flexible tube 116 with a port 117 (Fig. 7) in a casing 118 (Figures 4 and 7) containing a valve which is operated by a hand lever 119. A flexible tube 120 communicates at its lower end with the interior of piston chamber 99, through the bottom of said chamber, and communicates at its upper end with a port 121 in said valve casing 118. Said casing 118, as shown in Figure 5, is suitably carried by one of the vertical pipes 36a.

The valve casing 118 and mechanism therein are of well-known type. Briefly, the mechanism includes a diaphragm 122 which extends across the interior of the casing, and a plunger 123 having an extension 123' passing through said diaphragm and resting at its lower end on a disk 124, said extension being clamped to said diaphragm between a nut 125 and an annular flange 126 on said extension. The disk 124 is urged upwardly by a spring 127. The lower end of said casing supports a container 128 open at its bottom to the atmosphere and filled with cotton, oiled steel-wool, or other suitable filtering or dust-catching material 129. The plunger extension 123' is hollow, to provide communication between opposite sides of the diaphragm 122, and is also cut away at its side portions above said diaphragm as shown at 130.

Figure 7:
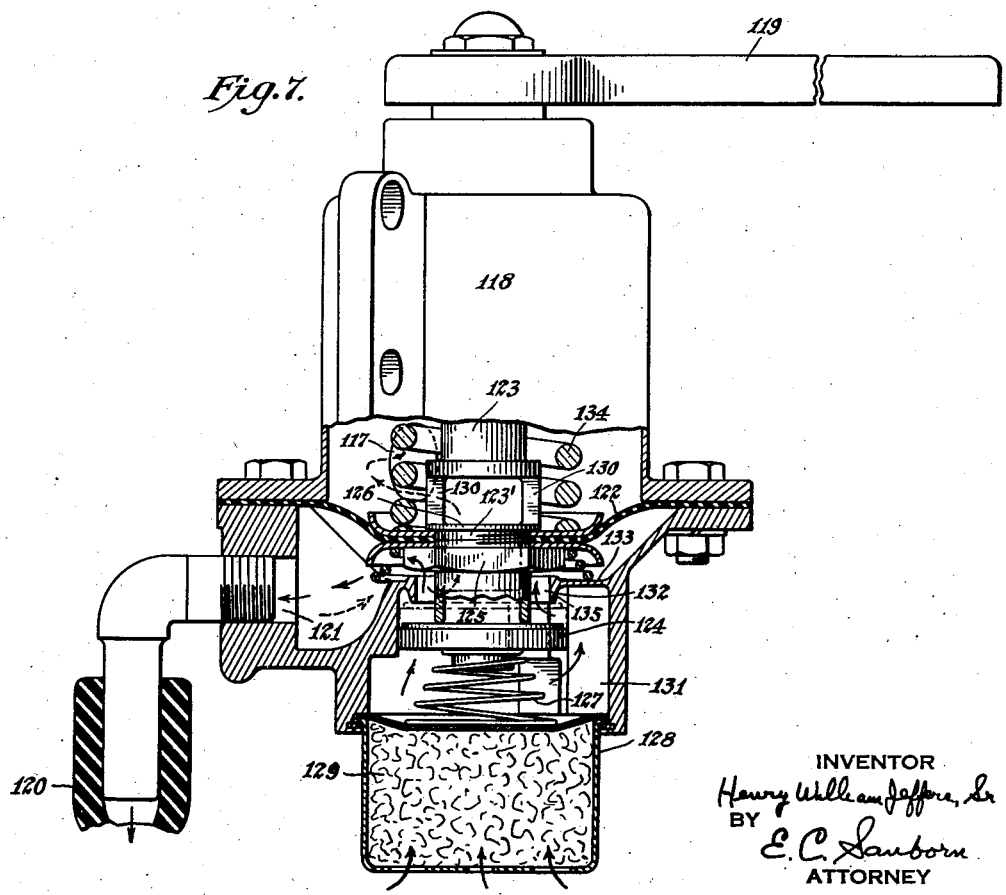
Fig. 7 is an enlarged vertical sectional view of a detail, taken on line 7—7 of Fig. 5.

When the handle 119 is in the position shown in full lines in Figure 5, the parts within the valve casing are in the position illustrated in Figure 7. Disk 124 now seats against the lower end of the hollow plunger extension 123', cutting off communication between ports 117 and 121. The port 121 is now open to atmosphere by way of container 128, passage 131 between guiding lugs for disk 124 in casing 118, and opening 132 in partition 133.

If, however, the handle 119 is turned to the dotted line position in Figure 5, plunger 123 is raised in casing 118, through well-known cam mechanism (not shown), relieving the spring 134. Disk 124 follows into the dot-dash line position, wherein it is seated on the lower surface of the flange 135 surrounding the opening 132, thereby shutting off atmosphere from the portion of the casing above said opening 132. Plunger 123 is raised further by said turning of handle 119, leaving disk 124 seated, and placing port 117 in communication with port 121, through the path indicated by dotted arows; i. e., through the lower end of said extension 123', the hollow interior thereof, and the slots 130.

When the parts are in the position shown in Fig. 7 (corresponding to full-line position of handle 119 in Fig. 5) it will be noted that disk 124, by engaging the hollow end of plunger 123, blocks communication between the atmosphere and the port 117, and also blocks communication between port 117 and port 121.

Since the mechanism in the casing 118 is conventional and well-known, it need not be further described herein.

Figure 10:
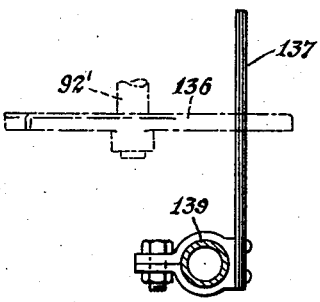
Fig. 10 is a detail view taken on line 10—10 of Fig. 9.

The stem 92' (Fig. 3) of each valve 92 projects downwardly from the casing 91 and has secured thereto a four-armed wheel 136 (Figures 3, 4, and 9). In the rotation of the table 14, said wheel is operated at appropriate times by trip devices 137, 138 (Figures 2, 3, 4, 9, and 10) secured to a stationary rod 139 suitably supported below said table. To assist in proper operation of the valves 92, each valve casing 91 has integral therewith a guide comprising a pair of bars 140, 141 spaced apart and diverging in front to insure passage therebetween of the actuating trips 137, 138 and engagement thereof with arms of the wheel 136 during rotation of the platform. The trips aforesaid may advantageously be constructed of resilient strips of metal as shown in Figure 10.

For convenience in describing the sequence of operation of the gates 74 and stanchions 81 through the mechanism above described, the stall at the rear of the open gate 74 in Figure 2 will be designated by the letter A, the stall immediately in advance thereof by B, and the stall in communication with the entrance walkway 12 by C. As the stall A approaches its position shown in Figure 2, during rotation of the table 14 in the direction of the arrow, its valve wheel 136 is rotated by trip 137 to bring valve 92 into the position shown in Figure 9, wherein the bottom of cylinder 100 is in communication with atmosphere, as a result of which piston rod 107 is elevated into the position shown in Figures 3, 4, and 5, and said gate 74 is opened. In said position of valve 92 the tube 116 and port 117 of valve casing 118 are also in communication with atmosphere, and since valve handle 119 is at this time in the dotted line position (Fig. 5), so that ports 117 and 121 are in communication with each other, atmosphere is also admitted into the lower portion of cylinder 99; as a result of which piston rod 101 is raised concurrently with rod 102 into its elevated position (Figures 3, 4, and 5) and the stanchions 81, 81 in stall A are opened.

The cow in said stall A is thus released and is free to depart through the open gate 74, through the adjacent portion of stall B, and on to the exit walkway 13. It will be noted that in its open position, as shown in Figures 2 and 5, the gate 74 is inclined to assist in guiding the cow toward said exit walkway in the direction of the arrows in Figure 5.

After the cow has left said stall, an attendant turns the hand lever 119 into the full line position shown in Figures 5 and 7 for a purpose presently to be noted.

As the rotation of the turntable continues in the direction indicated in Figure 2, the trip 138 actuates valve wheel 136 of stall A and turns valve 92 into the dotted line position in Figure 9, wherein the tube 96 is connected through pipe 93 to the vacuum line 89. Air is now exhausted from the bottom of piston chamber 100, as the result of which the piston in said chamber moves downwardly and draws with it the rod 107, thereby closing the gate 74.

The turning of the valve 92 into said dotted line position in Figure 9 also connects to vacuum the tube 116 and port 117 of the hand-valve casing 118. This, however, has no effect upon the piston 99' in cylinder 99, since the valve handle 119 at this time is in the position shown in Figures 5 and 7, and the plunger 123 and associated parts are in the positions shown in full lines in Fig. 7, wherein disk 124 is engaged by plunger extension 123', port 117 is cut off from communication with port 121, and the latter port is in communication with the atmosphere. The vacuum in the portion of casing 118 above the diaphragm 122 is insufficient to overcome the spring 134 which maintains said diaphragm and associated parts in the position referred to. The lower part of cylinder 99 thus remains open to atmosphere through tube 120, port 121, and container 128.

The stanchions 81, 81 in said stall A, which is now moving into the position formerly occupied by stall B, are operated to set position by the above-mentioned lowering of piston rod 102 to close the gate. Said lowering of said rod 102 draws the connected end of lever 103 downwardly, bringing said lever into the position shown in dotted lines in Figure 4, said lever turning against plate 104 as a fulcrum since piston rod 101 remains elevated as above described. Link 106 is drawn downwardly by said turning of said lever, into the dot-dash position in Figure 4, and thereby actuates lever 87 to draw the stanchions 81, 81 toward each other into an intermediate or "set" position, shown by dotted lines in Figure 3. In this position the stanchions are separated sufficiently to permit the head of the cow to enter in the space between them, though not sufficiently to permit passage of the body of the cow.

When said stall A reaches approximately the position of stall C in Figure 2, said stall A is opposite the entrance walkway 12, and a cow thereupon enters said stall, as indicated in dotted lines. After said cow moves forwardly sufficiently to bring its neck between the stanchions (as indicated at D in Figure 2), the attendant turns the handle 119 from the full-line to the dotted-line position in Figure 5, raising the plunger 123 (Figure 7) as above described, cutting off communication between port 121 and the atmosphere, and placing said port 121 in communication with port 117. Since port 117 is now connected to vacuum through valve 92, it will be apparent that the space in chamber 99 below the piston 99' is likewise connected to vacuum, whereupon said piston 99' descends and rocks lever 103 downwardly about its pivotal connection to rod 102, lowering the link 106 and shifting the stanchions further toward each other into the closed position indicated in dot-dash lines in Figure 3. Said stanchions are now sufficiently close together to prevent the head of the cow from being withdrawn, as indicated in connection with the cow shown at D (Fig. 2) without, however, engaging the neck of the cow so closely as to cause discomfort to the cow.

The stanchions remain in said closed position during the continued rotation of the table 14, until the stall again approaches position A in Figure 2, whereupon trip 137 turns the valve 92 into its full-line position in Figure 9, opening port 97 to atmosphere and placing atmosphere into communication with the lower part of chamber 100 through tube 115. At the same time, atmosphere is placed in communication with the lower part of chamber 99 through tube 116, and ports 121 and 117 of the hand-valve casing 118, it being noted that the handle 119 of said valve remains in the dotted line position of Figure 5, and that consequently the ports 117 and 121 remain in communication with each other. The springs in the chambers 99 and 100 thus now restore the pistons into their uppermost positions, opening the gate 74 and opening the stanchions as hereinbefore described, so that the cow is released and can depart from the stall on to the exit walkway 13.

As the table 14 continues its rotation the cycle of operations above described is repeated.

While the operation of stanchions 81, 81, and gate 74 has been described specifically in conjunction with only one of the stalls 34, it will of course be understood that each stall is provided with a duplicate of the gate and stanchion operating mechanism above described, including a trip valve 92, hand-valve 118, and connections to a pair of chambers 99, 100, for actuating its stanchions and gate at appropriate times during the rotation of table 14, in the same manner as hereinbefore specified.

It will be apparent that, if desired, each of the hand levers 119 of the respective valves 118 might be turned by a stationary trip device from its dotted to its full line position (Fig. 5) during rotation of the table 14, said trip device being so located as to actuate said lever at a suitable point in the rotation of the table which is passed by the stall after the cow has departed therefrom and before the stall is in position for receiving another cow. Also, each of said levers 119 might be operated, by another stationary trip device, from the full to the dotted line position above mentioned, at an appropriate point in the rotation of the table, for automatically controlling the shifting of the stanchions from "set" to closed position. It is preferred, however, to operate each of said levers 119 by hand, especially for moving the stanchions from "set" to closed position, so that such operation will not occur until the attendant has ascertained that the cow is in the proper position.

It will be seen that if an operator should forget to turn the handle 119 of a hand valve 118 to the closed or full line position (Fig. 5) upon exit of a cow from stall A (Fig. 2), the subsequent operation of valve 92 of said stall by trip 138 during the continued rotation of the platform will result not only in closing of the gate of said stall but also in movement of the stanchions to closed position. However, the operator may then, by turning the handle 119 into said full line position (Fig. 5), place the parts of valve 118 into the position shown in Fig. 7, in which communication between ports 117 and 120 is disestablished, and port 120 is placed in communication with the atmosphere through the bottom of container 129; and thereupon the piston in cylinder 99 will be raised into its uppermost position, shifting the stanchions from closed to "set" position, so that a cow may insert its head and neck between said stanchions, as previously described.

Each of the pipes 93 connecting the vacuum line 89 to the respective valve casings 91 may be provided with a throttling valve 93' (Fig. 4) which may be set to soften the closing action of the gate and stanchions as desired.

Rubber stop elements 74', 74" (Fig. 5) are provided in each stall for engagement by the associated gate 74 in its respective open and closed positions.

It may be noted that, when each gate 74 is closed, the toggle links 109, 110 connected thereto are in alignment with each other, thereby taking any thrust of the cow off of the vacuum pull in the cylinder 100 and providing a positive lock for the closed gate.

Each stall 34 may also include an illuminating unit of well-known type comprising a source of light below a transparent or translucent plate 142 (Fig. 2) which unit is set flush with the platform and provides illumination for showing the cow to advantage when the apparatus is being exhibited for public instruction or entertainment. As illustrated, said light unit may be so positioned as to be under the cow's udders, for illuminating especially the milking operation. A plate 143 (Fig. 8) displaying the name of the cow may also be supported on vertical bars 144 extending between the rods 36', 36" of the outer framework of each stall.

In the stall designated A in Figure 2, a door 145 covers an opening through which the stationary manure gutter 38 may be thoroughly cleaned. The cleaning may be accomplished, for example, by inserting a broom or like implement through said opening into engagement with said gutter, said broom being carried around said gutter by the rotation of the table 14.

Figure 14:
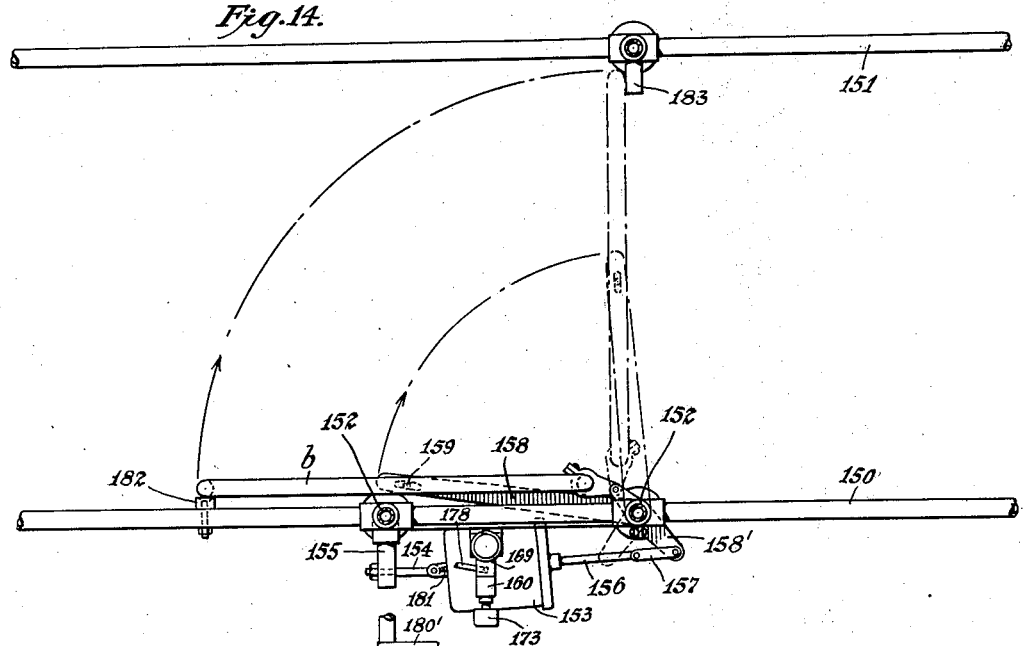
Fig. 14 is a plan view showing one of the walk-way gates and certain associated parts.
Figure 15:
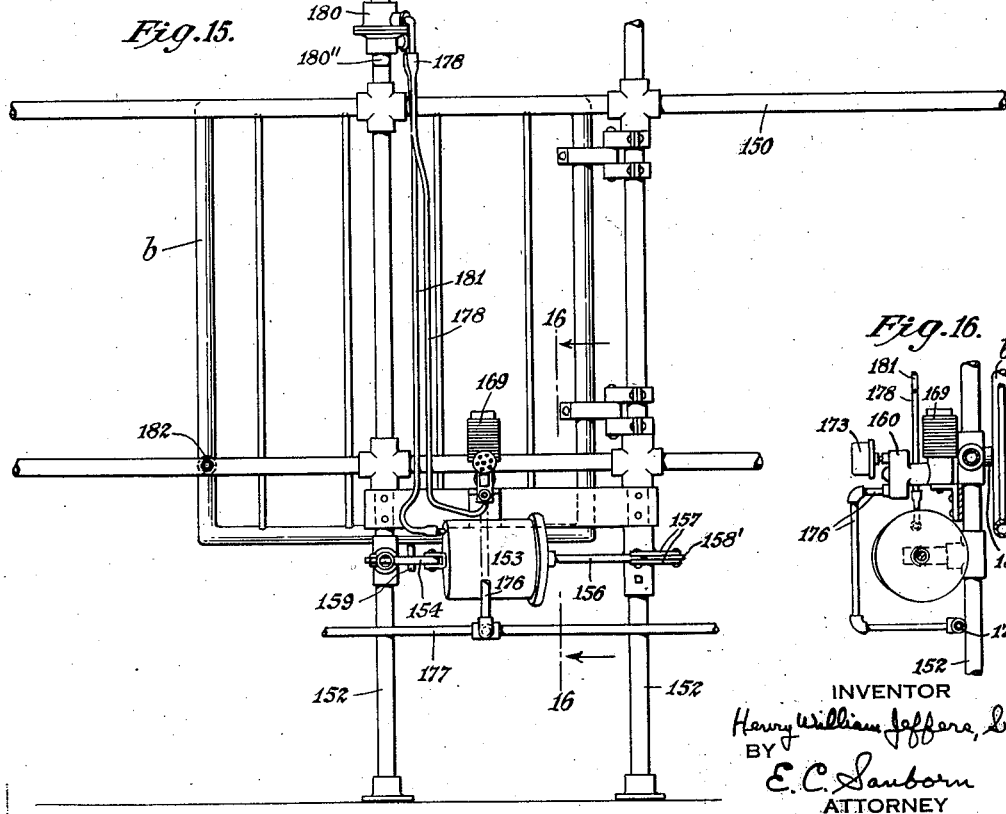
Fig. 15 is a side elevational view of the construction shown in Fig. 14.
Figure 16:
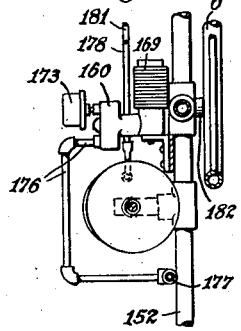
Fig. 16 is a detail view in vertical section, on line 16—16 of Fig. 15.

As previously noted, the cows pass from the barns to the rotary table 14 along a walk-way 12. Means are provided for controlling the passage of the cows through said pathway in timed relation to the travel of the table, which means may be constructed substantially as follows:

Said walk-way is provided at its sides with guide frames 150, 151 (Fig. 14) each of which may comprise horizontal rails or pipes suitably supported by vertical pipes 152 (Fig. 15). Between said guide frames are a series of gates designated a, b, c, d, e, f, g, and h. As shown in Figs. 14 and 15 in connection with gate b, each of said gates may be pivotally supported by a corresponding one of the vertical rods or pipes of the guide frame 150.

Connected to each of said walk-way gates for operating the same is a corresponding one of a series of piston chambers 153, each of which may be pivotally carried in any convenient manner by an adjacent one of the vertical pipes 152. For example, as shown, in Figs. 14 and 15, each cylinder 153 may be pivotally supported by an arm 154 carried by another arm 155 secured to and projecting laterally from a vertical frame pipe 152.

Figure 17:
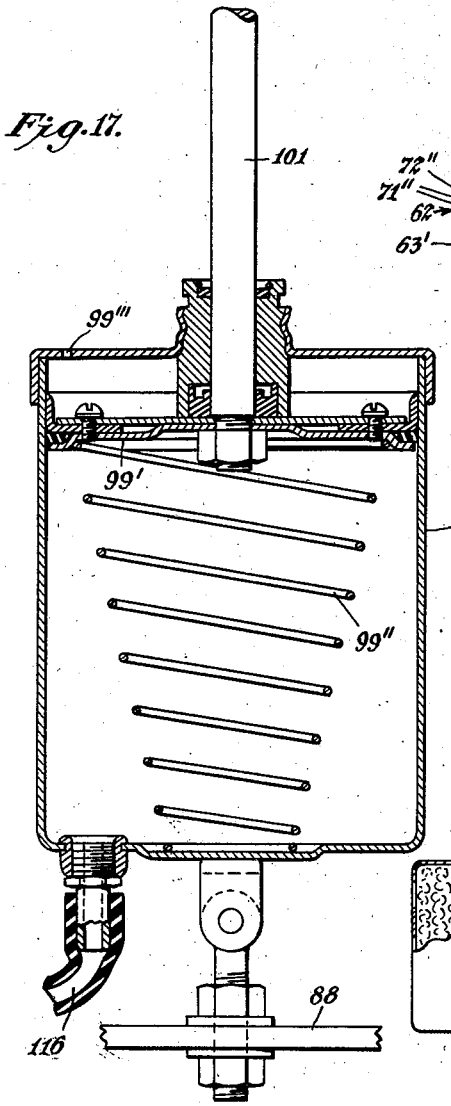
Fig. 17 is a vertical sectional detail view showing a pneumatically-controlled piston mechanism.

Each cylinder 153 may contain a piston and spring arranged in the same manner as in cylinder 99 (Fig. 17). The rod 156 of each of said pistons is connected to the corresponding walk-way gate in any suitable manner as through links 157 (Figs. 14 and 15), and extension 158' of a lever 158 rotatably mounted on a frame pipe 152, which lever has a slot engaged by a pin 159 depending from the associated gate.

Adjacent each cylinder 153 is a solenoid-valve unit arranged to control the operation of the cylinder. As shown in Figs. 15-18, said unit may comprise a casing 160 having ports 161, 162 adapted to be opened and closed by valves 163, 164 carried by and movable with a bar 165. Pivoted in said casing and extending through a slot in said bar is a lever 166 which is connected to the arm 167 of a solenoid core 168 in said casing, the winding 169 of which core may be wound around the corresponding portion of the casing and may be energized and deenergized at appropriate times as hereinafter described. Each valve 163, 164 is engaged by a corresponding one of a pair of springs 170, 171, each of which springs is compressed by movement of its valve to open the associated port 161 or 162.

A chamber 173, open at one end to the atmosphere, and containing cotton or other suitable filtering material, is mounted at its other end in a wall of a chamber 174 above the valve 163 and is in communication with said chamber. Mounted in a wall of a chamber 175 below the valve 164 is a pipe 176 which communicates with said chamber and also with a vacuum pipe 177. The latter extends along one side of the walkway and is connected to any suitable source of vacuum supply, as, for example, the pumps 60.

Figure 18:
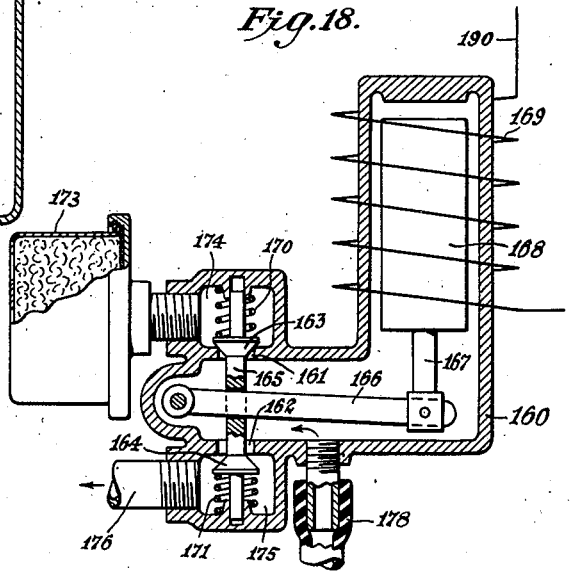
Fig. 18 is a vertical sectional detail view showing solenoid-valve means adapted to control a walk-way gate.

A tube 178 communicates with the interior of casing 160 as shown in Fig. 18 and extends into communication with a port in a hand-valve casing 180. The latter, and the parts therein, are of well-known construction and may be the same as illustrated in Fig. 7 and previously described herein. Also communicating with a port in said valve casing 180 is a tube 181 which also communicates through an end of cylinder 153, with the space in said cylinder behind the piston therein. The ports in the casing 180, with which the tubes 178, 181, communicate, correspond with ports 117, 120, respectively of the aforementioned casing 118; and the handle 180' is normally in such position as to establish communication between said tubes, through said ports, in the same manner that communication between tubes 116 and 120 is established through ports 117 and 121 aforesaid when the handle 119 is in the normal or dotted line position shown in Fig. 5. In this position of said handle, communication between tube 181 and the atmosphere, by way of chamber 180'' (corresponding to chamber 128 of casing 118) is cut off in the same manner as hereinbefore described with respect to tube 120 and chamber 128.

When the solenoid winding 169 is de-energized, the parts are in the position shown in Fig. 18, wherein the port 161 is closed by valve 163, and port 162 is open. Atmosphere is now cut off from access to tube 178, but the vacuum line is connected to said tube through port 162. Said vacuum line is also connected to cylinder 153 through said tube 178, the valve-mechanism in casing 180 and tube 181, as the result of which the piston rod 156 is drawn to the left in Figs. 14 and 15 and the walk-way gate is swung into the closed position indicated in dotted lines in Fig. 14.

When, on the other hand, said solenoid winding 169 is energized, the lever 166 (Fig. 18) is raised, causing valve 164 to close port 162 and valve 163 to open port 161. Vacuum is now cut off from the cylinder 153, but atmosphere is connected thereto through chamber 173, port 161, tube 178, the ports in casing 180, and tube 181. Since the opposite end of cylinder 153 is continuously open to atmosphere through suitable openings, the spring in said cylinder now shifts the piston outwardly (as illustrated and described in connection with cylinder 99) thereby acting through piston rod 156 and lever 158 to restore the gate into its open position, shown in full lines in Fig. 14.

While the hand valve 180 may be omitted, and tube 178 connected directly to the rear or left hand end of cylinder 153 in Figs. 14 and 15, said valve is provided to enable the operation of the gate to be controlled manually independently of the automatic control through solenoid winding 169. More particularly, if it is desired to open a walk-way gate, even though the corresponding solenoid winding 169 is de-energized, the valve handle 180' is turned to bring the valve mechanism into the position shown in connection with valve 118 in Fig. 7, as the result of which communication between tubes 178 and 181 is blocked and tube 181 is connected to atmosphere. Atmosphere is thereby supplied through tube 181 to cylinder 153 and the gate is opened. Upon thereafter returning said valve handle into its normal position, the valve mechanism is restored into such position as to cut off atmosphere from tube 181 and to establish communication between said tube and tube 178, restoring the control of solenoid winding 169 over the walkway gate, and causing closing of the latter if said solenoid is de-energized.

It will, of course, be understood that a hand valve 180 may be provided for each walk-way gate, between its corresponding solenoid-valve 160 and cylinder 153.

It will also be apparent that, in lieu of providing the hand valves 180 for enabling the walkway gates to be opened at the will of the operator, the same result may be accomplished by manually operable switches for the solenoids, so that a circuit may be closed at will through any desired solenoid winding 169, irrespective of the condition of the automatically operable circuit-closer for said solenoid.

Suitable rubber stops 182, 183 may be provided for each walk-way gate, as shown in Figure 14, for engagement by the gate in its open and closed positions, respectively.

Mounted in the excavation beneath the platform 14 is a stationary rail 185 (Fig. 13), which supports a series of circuit closers 186, one for each of the walk-way gates. One terminal of each circuit closer is connected by wire 187 to current main 188, while the other terminal is connected through a wire 190 with a terminal of one or more of the solenoid windings 169. The other terminal of each solenoid winding is connected to a wire 191 which in turn is connected to current main 189. Said circuit closers 186 are of any suitable well-known construction, and each includes an arm adapted to be engaged and operated to circuit closing position by shoes 192 carried by frames 88 on the bottom of the table 14 and rotating therewith. For convenience in description, the solenoids shown in Fig. 13 are designated 169a—169h, respectively, to identify the respective gates which they control, while the circuit closer arms are respectively designated a'—g'. One circuit-closer operating shoe 192 is provided for each stall 34 on the table 14.

As a stall 34 approaches the position designated C in Fig. 2, its shoe 192 engages circuit closer arm a' and actuates the latter to close a circuit through solenoid 169a, whereupon the walk-way gate a is opened, so that a cow may now pass through said gate and thence into said stall 34.

As the rotation of the table 14 continues, said shoe 192 passes beyond said arm a', whereupon the circuit through solenoid 169a is broken and gate a closes. At about the same time said shoe comes into engagement with circuit closer arm b' and operates the latter to energize solenoid 169b, causing gate b to open and enabling a cow behind said gate to pass into the space behind gate $a$; said gate $b$ thereafter closing when said shoe 192 passes out of engagement with arm $b'$.

Similarly, during the continued rotation of table 14, said shoe 192 operates successively the circuit closer arms $c'$—$g'$, energizing and de-energizing successively the respective solenoids 169c—169g, and permitting the cows behind the gates $c$—$g$ to pass into the respective spaces ahead of said gates. At about the time that said shoe 192 departs from engagement with arm $g'$, shoe 192 of the next stall 34 operates arm $a'$, opening gate $a$ to permit the cow behind said gate to pass into said next stall, after which the foregoing cycle is repeated as rotation of table 14 proceeds.

It may be noted that the operation of circuit closer arm $a'$ by a shoe 192 energizes not only the solenoid 169a but also the solenoid 169h, so that gate $h$ is opened at the same time as gate $a$ to enable a cow to advance therethrough.

It will be observed that, as gates $a$ and $h$ operate together they will both remain closed during the successive opening of gates $b$—$g$. In this manner, all of the cows may move forward to a position one gate in advance, with the leading cow again between $a$ and $b$ and with the space between gates $g$ and $h$ empty and in readiness to receive a new cow at the same time that the space between gates $a$ and $b$ is emptied. Advancing is then repeated with gates $a$ and $h$ again closed.

It will furthermore be apparent that, if desired, each of the pistons in the cylinders 153 may be connected to its respective walk-way gate through toggle links in the same way in which each of the pistons in cylinders 100 is connected to the corresponding stall gate 74.

The rotation of the table 14, while continuous, is sufficiently slow to enable the performance of the milking and other operations above-described, and also to enable the cows to pass safely from the walk-way 12 into the respective stalls, as well as to depart from said stalls on to the walk-way 13, during the rotation of said table. Each cow is washed, dried, and milked during its travel on said table from the entrance to the exit walk-way. It will be noted that the cows depart from the rotating table 14 on the same side as that from which they entered their stalls, without the necessity of crossing above or below the table.

The tandem arrangement of the stalls not only enables the cows to enter and depart from the table 14 on the same side of the latter, but also provides the public with a full side view of the cows during the milking and other operations which take place during the rotation of the table. Through the gates 74 and stanchions 81, and their operations as above described, the positioning of the cows in the stalls and their egress therefrom are effectively regulated in appropriate relation to the rotation of the table 14. The passage of the cows toward said table is at the same time controlled in coordination with the rotation of the table, through the shoes 192 and solenoid-valves associated with the walk-way gates.

The supporting of the vacuum pumps and pulsators in the excavation and the leading of vacuum and electric impulses therefrom to the apparatus on the rotating table through the swivel joint 62 avoids the necessity of carrying said pumps and pulsators with the rotating table and simplifies its construction and operation.

By the provision of the manure gutter 38 beneath the table 14 for receiving manure through the stall gratings 37 the disposal of the manure is segregated from the space adjacent the upper surfaces of the table and is accomplished in an improved and especially hygienic manner. Hygienic conditions are further augmented by the location of said table 14 above the area 15, from which area the attendants may attach and detach the teat-cups, operate hand-valves 118, and perform other operations without entering upon said table.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. Apparatus for treating the animals of a group in succession, said apparatus comprising a movable platform, means for moving the same, stalls on said platform, each of said stalls comprising framework secured to said platform and a gate movably supported by said framework, vacuum-producing means, means connected to said vacuum-producing means for milking said animals while in said stalls, means connected to said vacuum-producing means for operating said gates successively, and means controlled by movement of said platform for controlling said gate-operating means.

2. Apparatus for treating the animals of a group in succession, said apparatus comprising a movable platform, means for moving said platform, stalls on said platform, stanchions in said stalls, and means controlled by movement of said platform for controlling operation of the stanchions in the successive stalls.

3. Apparatus for treating the animals of a group in succession, said apparatus comprising a movable platform, means for moving said platform, stalls on said platform, stanchions in said stalls, means controlled by movement of said platform for controlling operation of the stanchions in the successive stalls to a given position, and manual means for controlling movement of said stanchions to another position.

4. Apparatus for treating the animals of a group in succession, said apparatus comprising a movable platform, means for moving said platform, stalls on said platform, stanchions in said stalls, and means controlled by movement of said platform for opening the stanchions in the successive stalls as said stalls pass a given point and for moving said stanchions toward closed position as said stalls pass another point.

5. Apparatus for treating the animals of a group in succession, said apparatus comprising a movable platform, means for moving said platform, stalls on said platform, stanchions in said stalls, means controlled by movement of said platform for opening the stanchions in the successive stalls and for moving said stanchions to partially-closed position, and manual means for controlling movement of said stanchions to fully closed position.

6. Apparatus for treating the animals of a group in succession, said apparatus comprising a movable platform, means for moving said platform, stalls on said platform, stanchions in said stalls, gates for said stalls, and means controlled by movement of said platform for controlling operation of the gates and stanchions of the respective stalls.

7. Apparatus for treating the animals of a group in succession, said apparatus comprising a movable platform, means for moving said platform, stalls on said platform, stanchions in said stalls, gates for said stalls, and means controlled by movement of said platform for opening the gates and stanchions of successive stalls as said stalls pass a given point, and for closing said gates and moving said stanchions toward closed position as said stalls pass another point.

8. An apparatus for treating the animals of a group in succession, said apparatus comprising a movable platform, means for moving said platform, stalls on said platform, stanchions in said stalls, gates for said stalls, means controlled by movement of said platforms for opening the gates and stanchions of successive stalls as said stalls pass a given point and for closing said gates and moving said stanchions into partially-closed position as said stalls pass another point, and means for manually controlling movement of said stanchions into fully closed position.

9. Apparatus for treating the animals of a group in succession, said apparatus comprising a movable platform, means for moving said platform, stalls on said platform, stanchions in said stalls, and pneumatic means controlled by movement of said platform for controlling operation of the stanchions in the successive stalls.

10. Apparatus for treating the animals of a group in succession, said apparatus comprising a movable platform, means for moving said platform, stalls on said platform, stanchions in said stalls, gates for said stalls, and pneumatic means controlled by movement of said platform for controlling operation of the gates and stanchions of the respective stalls.

11. Apparatus for treating the animals of a group in succession, said apparatus comprising a movable platform, means for moving said platform, stalls on said platform, stanchions in said stalls, gates for said stalls, a pair of pneumatically operable members for each stall, means connecting one of said members to the gate of the corresponding stall, a floating lever connecting said members, means connecting said lever with the stanchions of said stall, and means controlled by the movement of said platform for controlling the operation of said members.

12. Apparatus for treating the animals of a group in succession, said apparatus comprising a movable platform, means for moving said platform, stalls on said platform, stanchions in said stalls, gates for said stalls, vacuum-producing means, means connected to said vacuum-producing means for milking said animals while in said stalls, means connected to said vacuum-producing means for operating the gates and stanchions of successive stalls, and means controlled by movement of said platform for controlling said operating means.

13. Apparatus for treating the animals of a group in succession, said apparatus comprising a movable platform, means for moving said platform, stalls on said platform, stanchions in said stalls, gates for said stalls, pneumatically operable piston means for each stall, means connecting said piston means to the gate and stanchions of the corresponding stall, and means for connecting said piston means to atmosphere and vacuum at different points in the travel of said platform.

14. Apparatus for treating the animals of a group in succession, said apparatus comprising a movable platform, means for moving said platform, stalls on said platform, stanchions in said stalls, gates for said stalls, a pair of pneumatically operable piston means for each stall, means connecting one of said piston means to the gate of the corresponding stall, a floating lever connecting one of said piston means to the other, means connecting said lever to the stanchions of said stalls, valve means carried by said platform for each stall and adapted to connect one of said piston means alternately to atmosphere and vacuum for opening and closing the gate of the corresponding stall in response to movement of said stall past different points, manually operable valve means for each stall, connections from each manually operable valve means to the first mentioned valve means and the other piston means of the corresponding stall, said manually operable valve means when in one position placing said other piston means in communication with said first-mentioned valve means and in another position disestablishing said communication and connecting said piston means to atmosphere.

15. Apparatus for treating the animals of a group in succession, said apparatus comprising a movable platform, means for moving said platform, stalls on said platform, stanchions in said stalls, gates for said stalls, pneumatically operable piston means for each stall, means connecting said piston means to the gate and stanchions of the corresponding stall, valve means carried by the platform for each stall and operable in response to movement of the corresponding stall past certain points for connecting the piston means alternately to different fluid pressures, and manually operable means for connecting a portion of each piston means to one of said fluid pressures independently of said valve means.

16. Apparatus for treating the animals of a group in succession, said apparatus comprising a movable platform, means for moving said platform, stalls on said platform, a pathway leading to said platform, gate means in said pathway, and means controlled by the approach of successive stalls to said walkway for operating said gate means to admit animals to the respective stalls.

17. Apparatus for treating the animals of a group in succession, said apparatus comprising a movable platform, means for moving said platform, stalls on said platform, each stall having a gate and a pair of stanchions, entrance and exit pathways adjacent said platform, a gate in said entrance pathway, means responsive to the arrival of a stall at a given position with respect to said entrance pathway for opening the last-mentioned gate to enable an animal to pass from said pathway to said stall, and means responsive to the arrival of said stall at a given position with respect to said exit pathway for operating the gate and stanchions of said stall to release the animal therefrom.

18. Apparatus for treating the animals of a group in succession, said apparatus comprising a movable platform, means for moving said platform, a pathway leading to said platform, a series of gates in said pathway for dividing the latter into areas for the reception of one animal at a time, and means controlled by movement of said platform for operating said gates in predetermined sequence.

19. Apparatus for treating the animals of a group in succession, said apparatus comprising a movable platform, means for moving said platform, a plurality of stalls on said platform, a pathway leading to said platform, a series of gates in said pathway for dividing the latter into areas for the reception of one animal at a time, means responsive to the arrival of a stall at a given position with respect to said pathway for opening the pathway gate nearest said stall to enable an animal to pass into said stall, and means responsive to continued movement of said platform for closing said nearest gate and opening the next gate in said pathway.

20. Apparatus for treating the animals of a group in succession, said apparatus comprising a movable platform, means for moving said platform, a plurality of stalls on said platform, a pathway leading to said platform, a series of gates in said pathway for dividing the latter into areas for the reception of one animal at a time, means responsive to the arrival of a stall at a given position with respect to said pathway for opening the pathway gate nearest said stall to enable an animal to pass into said stall, and means responsive to continued movement of said platform for closing said gate and for opening and closing the other gates in succession prior to the arrival of the succeeding stall in said position.

21. Apparatus for treating the animals of a group in succession, said apparatus comprising a movable platform, means for moving said platform, stalls on said platform, a pathway leading to said platform, gates in said pathway dividing the latter into areas for the reception of one animal at a time, means responsive to the arrival of a stall at a given position with respect to said pathway for opening the first and last gates of said series concurrently, and means responsive to continued movement of said platform for closing said gates and for opening and closing the other gates in succession prior to the arrival of the succeeding stall in said position.

22. Apparatus for treating the animals of a group in succession, said apparatus comprising a movable platform, means for moving said platform, stalls on said platform, each stall having a gate and stanchcions, entrance and exit pathways leading to said platform, means responsive to the arrival of a stall in a given position with respect to said exit pathway for opening the gate and stanchions of said stall to release the animal therein, means for causing closing of said gate and movement of said stanchions toward closed position during the travel of said stall in another position, a gate in said entrance pathway, and means for causing opening of said pathway gate upon the arrival of said stall at a given position with respect to said pathway to permit an animal to pass from said pathway into said stall.

23. Apparatus for treating the animals of a group in succession, said apparatus comprising a movable platform, means for moving said platform, stalls on said platform, each stall having a gate and stanchions, entrance and exit pathways leading to said platform, means responsive to the arrival of a stall in a given position with respect to said exit pathway for opening the gate and stanchions of said stall to release the animal therein, means for causing closing of said gate and movement of said stanchions toward closed position during the travel of said stall in another position, a gate in said entrance pathway, and means for causing opening of said pathway gate upon the arrival of said stall at a given position with respect to said pathway to permit an animal to pass from said pathway into said stall, and means for moving said stanchions to fully closed position after the animal is received in said stall.

24. Apparatus for treating the animals of a group in succession, said apparatus comprising a movable platform, means for moving said platform, stalls on said platform, each stall having a gate and stanchions, entrance and exit pathways leading to said platform, means responsive to the arrival of a stall in a given position with respect to said exit pathway for opening the gate and stanchions of said stall to release the animal therein, means for causing closing of said gate and movement of said stanchions toward closed position during the travel of said stall in another position, a series of gates in said entrance pathway, means for causing opening of the first of said series of pathway gates upon the arrival of said stall at a given position with respect to said pathway to permit an animal to pass from said pathway into said stall, and means responsive to continued movement of said platform for closing said pathway gate and opening and closing others of said series of pathway gates in succession.

25. Apparatus for treating the animals of a group in succession, said apparatus comprising a moving platform, means for moving the same, a pathway leading to said platform, gates in said pathway, means controlled by the movement of said platform for operating said gates in a predetermined sequence for regulating the passage of animals along said pathway and on to said platform, and manually operable means for selectively controlling the operation of said gates at the will of the operator.

26. Apparatus for treating the animals of a group in succession, said apparatus comprising a moving platform, means for moving the same, a pathway leading to said platform, gates in said pathway, and pneumatic means controlled by the movement of said platform for operating said gates in a predetermined sequence for regulating the passage of the animals along said pathway and on to said platform.

27. Apparatus for treating the animals of a group in succession, said apparatus comprising a moving platform, means for moving the same, a pathway leading to said platform, gates in said pathway, pneumatic means for operating said gates, and electrical means controlled by the movement of said platform for causing said pneumatic means to operate said gates in a predetermined sequence for regulating the passage of the animals along said pathway and on to said platform.

28. Apparatus for treating the animals of a group in succession, said apparatus comprising a moving platform, means for moving the same, stalls on said platform, each stall having a gate and a pair of stanchions, milking means in each stall, means controlled by movement of said platform for operating the gates and stanchions, a pathway leading to said platform, a gate in said pathway, means controlled by movement of said platform for operating said pathway gate, and vacuum-producing means connected to said milking means, said operating means for the stall gates and stanchions, and said operating means for the pathway gate.

29. Apparatus for treating the animals of a group in succession, said apparatus comprising a moving platform, means for moving said platform, stalls on said platform, each stall having stanchions and a gate, a vacuum line carried by said platform, means connected to said vacuum line and controlled by movement of said platform for operating the gates and stanchions of successive stalls, a stationary source of vacuum-supply, and means connecting said source with said vacuum line.

30. Apparatus for treating the animals of a group in succession, said apparatus comprising a movable platform, means for moving the same, stalls on said platform, means enabling ingress of animals to said stalls and their egress therefrom, each stall having stanchions and a gate, means comprising a plurality of members operable in a given direction for opening the gate and stanchions of a stall, means controlling movement of one of said members in another direction for closing said gate and moving said stanchions into partially closed position, and means controlling movement of the other of said members in said other direction for completely closing said stanchions.

31. Apparatus for treating the animals of a group in succession, said apparatus comprising a rotary platform, means for rotating the same, stalls on said platform in tandem relation, means enabling ingress of animals to said stalls, each stall having a gate at the leading end thereof, an exit walkway, and means controlled by movement of said platform as a stall approaches said exit walkway for opening the gate of said stall.

32. Apparatus for treating the animals of a group in succession, said apparatus comprising a rotary platform, means for rotating the same, stalls arranged in tandem relation on said platform, means enabling ingress of animals to successive stalls, and means enabling egress of an animal in each stall through the immediately preceding stall.

33. Apparatus for treating the animals of a group in succession, said apparatus comprising a rotary platform, means for rotating the same, stalls arranged in tandem relation on said platform, entrance and exit walkways for the passage of animals to and from said platform, each stall having an open portion adjacent the outer side of said platform for enabling an animal to pass into said stall from said entrance walkway, and means enabling egress of an animal in each stall through said open portion in the immediately preceding stall to said exit walkway.

34. Apparatus for treating the animals of a group in succession, said apparatus comprising a rotary platform, means for rotating the same, stalls arranged in tandem relation on said platform, entrance and exit walkways for the passage of animals to and from said platform, each stall having an open portion adjacent the outer side of said platform for enabling an animal to pass into said stall from said entrance walkway, each stall also having a gate at its leading end, and means responsive to the approach of a stall to said exit walkway for opening said gate to enable the animal in said stall to pass to said exit walkway through the open portion of the immediately preceding stall.

35. Apparatus for treating the animals of a group in succession, said apparatus comprising a rotary platform, means for rotating the same, stalls arranged in tandem relation on said platform, entrance and exit walkways for the passage of animals to and from said platform, each stall having an open portion adjacent the outer side of said platform for enabling an animal to pass into said stall from said entrance walkway, each stall also having a gate at its leading end, and means responsive to the approach of a stall to said exit walkway for opening said gate to enable the animal in said stall to pass to said exit walkway through the open portion of the immediately preceding stall, and means responsive to further movement of the platform for closing said gate.

36. Apparatus for treating the animals of a group in succession, said apparatus comprising a movable platform, means for moving said platform, stalls arranged in tandem relation on said platform, each of said stalls having stanchions and a gate, entrance and exit walkways for the passage of animals to and from said platform, means responsive to the approach of a stall to said exit walkway for opening the gate and stanchions of said stall to release an animal for egress to said exit walkway, means for causing further travel of said stall to close said gate and to move said stanchions to such extent toward closed position as to permit the head of an animal to pass therebetween while preventing passage of the shoulders of the animal beyond said stanchions, and means for subsequently moving said stanchions into fully closed position wherein they are adjacent opposite sides of the neck of the animal.

37. Apparatus for treating the animals of a group in succession, said apparatus comprising a rotatable platform, means supporting said platform at a substantial distance above a surrounding space for attendants, means enclosing the space beneath said platform, means for rotating said platform, stalls arranged in tandem relation on said platform, means enabling the ingress of animals to said platform and their egress therefrom, gratings in said stalls, a stationary gutter within said enclosing means for receiving manure through said gratings, and means for treating said animals during their travel between the points of ingress and egress.

HENRY WILLIAM JEFFERS, Sr.